United States Patent [19]

Scales et al.

[11] Patent Number: 4,869,018

[45] Date of Patent: Sep. 26, 1989

[54] SYSTEM FORMING A SELF-IRRIGATING, RAISED BED

[75] Inventors: Donald F. Scales, Oreland; Thomas R. Lambrix, Trevose, both of Pa.

[73] Assignee: HJS Enterprises, Inc., Huntington Valley, Pa.

[21] Appl. No.: 319,809

[22] Filed: Mar. 6, 1989

Related U.S. Application Data

[63] Continuation of Ser. No. 37,748, Apr. 13, 1987, abandoned.

[51] Int. Cl.$^4$ .............................................. A01G 1/08
[52] U.S. Cl. ........................................ 47/33; 47/48.5
[58] Field of Search .................... 47/25, 33, 48.5, 68, 47/73, 75, 83, 85-87; 220/18, 23.83, 23.86, 66; 446/105, 108, 114, 124, 116; 52/65, 71, 79.13, 79.5, 582, 603; 285/272, 280, 281

[56] References Cited

U.S. PATENT DOCUMENTS

| | | | |
|---|---|---|---|
| D. 278,075 | 3/1985 | Dryden | 47/79 X |
| 2,909,328 | 10/1959 | Babyak | 47/25 X |
| 2,911,794 | 11/1959 | Pearson | 47/33 X |
| 3,315,752 | 4/1967 | Pasquini | 47/33 X |
| 3,343,301 | 9/1967 | Adelman | 47/33 |
| 3,865,309 | 2/1975 | Greenhalgh | 47/33 X |
| 3,933,311 | 1/1976 | Lemelson | 47/33 X |

FOREIGN PATENT DOCUMENTS 1422293 11/1965 France ...................... 47/33

OTHER PUBLICATIONS

National Diversified Sales, Inc., Advitis., p. 13, American Nurseryman, 1986.

Primary Examiner—Richard J. Johnson
Assistant Examiner—Kevin G. Rooney
Attorney, Agent, or Firm—Caesar, Rivise, Bernstein, Cohen & Pokotilow, Ltd.

[57] ABSTRACT

Apparatus for forming an above ground bed in which plantlife may be grown and for irrigating the bed. The apparatus comprises a plurality of modular members arranged to be readily connected to one another to form a walled enclosure disposed on the ground. The enclosure is arranged to be filled with a plant growing medium, e.g., soil, to form the bed. Each of the members is an elongate hollow body having a pair of ends. At each end is a releasable connector portion which is arranged to releasably connect the members to one another at various angles to form enclosure of various shapes. Each of the members includes an inner wall having a plurality of small apertures which are in communication with the hollow interior of the member. At least one of the members includes a fitting for a hose to enable water to be introduced therein. The connectors include couplings which allow water introduced into one member to flow into the other members, whereupon the liquid may slowly seep out of the apertures and into the bed to irrigate the bed. The members also include openings extending through them to enable them to be staked to the ground. A recess is provided in the top wall of each member at one end thereof to enable auxiliary structures, e.g., trellises, frames, etc., to be mounted thereon. The staking openings can also be used for mounting the auxiliary structures.

14 Claims, 3 Drawing Sheets

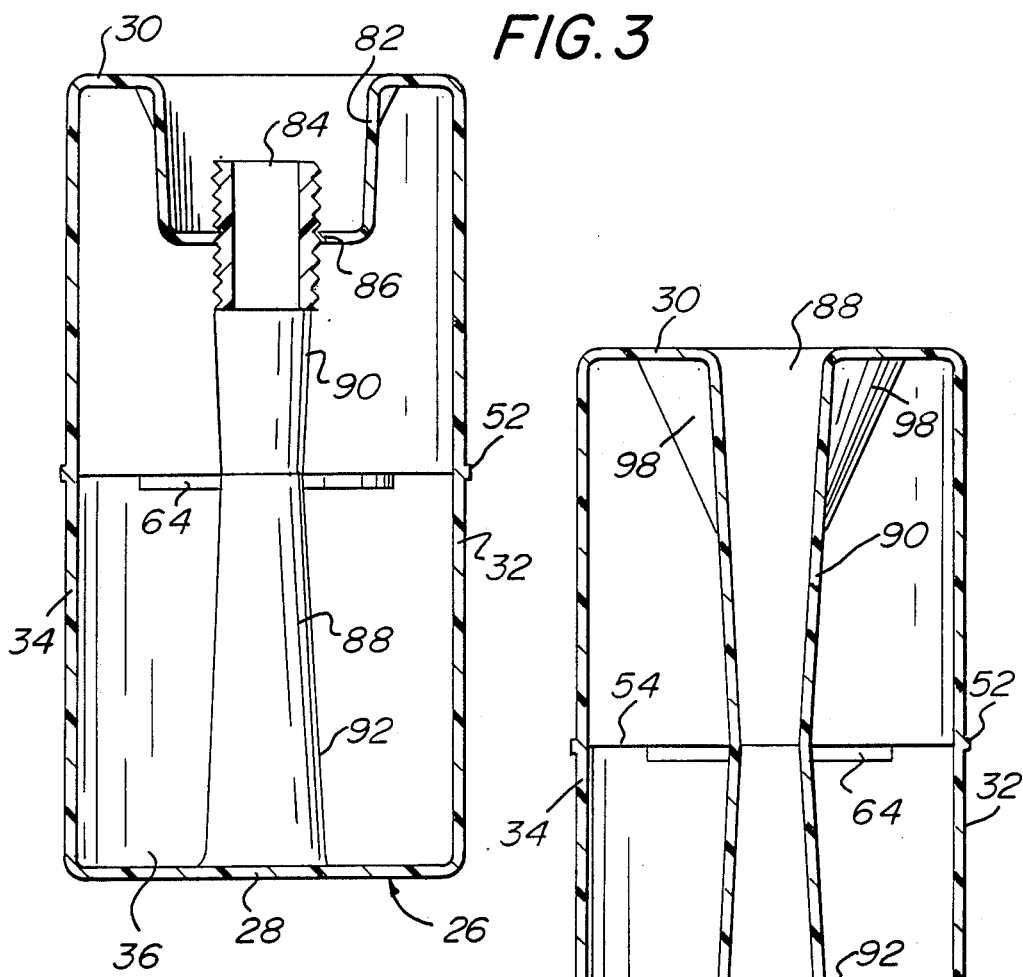
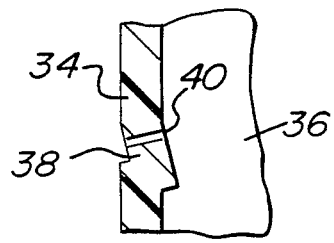

SYSTEM FORMING A SELF-IRRIGATING, RAISED BED

This application is a continuation of application Ser. No. 037,748, filed Apr. 13, 1987, now abandoned.

BACKGROUND OF THE INVENTION

This invention relates to agricultural equipment and more particularly to apparatus for forming a raised-bed for the growing of plants.

As is known to those skilled in the art, the so-called "raised-bed" technique for growing crops, plants or other vegetation has been utilized for hundreds of years. Basically, that technique entails building some enclosure on the surface of the ground and filling that enclosure with soil or some other plant growing medium. The advantages of raised-beds are that they can be planted far earlier in the spring because the soil dries out and warms up much more quickly. That aspect alone has made the raised-bed technique an ideal one for northern gardeners who frequently struggle with the short growing season. Moreover, raised-beds are easy to nourish with compost, peat or fertilizers, and less expensive, too, because the gardener is only building the soil where the plants are to grow, not in walkways, between roads, etc. Further still, a year-to-year maintenance of a raised-bed is minimal, drainage improves dramatically, and the problem of soil compaction is virtually eliminated. Further still, the garden has fewer weeds, and the gardener has a much easier time pulling out the ones that do grow. Those features, along with the excellent soil conditions promoted in the raised-bed, contribute to bigger yields, better quality harvest, and a generally more healthy, more productive garden.

Heretofore raised-beds have been formed by utilizing wooden beams, bricks, or other conventional building materials to form the enclosure. While such beds exhibit the advantages as mentioned heretofore, their assembly is somewhat difficult, is not conducive to ready disassembly, and/or reconfiguration, and, in addition, does not include means for effecting the efficient watering of the plants growing in the bed.

OBJECTS OF THE INVENTION

Accordingly, it is a general object of the instant invention to provide a raised-bed construction system which overcomes the advantages of the prior art.

It is still a further object of the instant invention to provide a modular system for making a raised-bed and which system is suitable for ready assembly, disassembly and reconfiguration.

It is still a further object of this invention to provide a modular system for forming a raised-bed and which is arranged to automatically and continuously irrigate the bed.

It is still a further object of the instant invention to provide a modular system for forming a self irrigating, raised-bed and which system enables the formation of various shaped and/or height beds.

It is yet a further object of this invention to provide a modular self irrigating raised-bed system and which is arranged for supporting thereon various auxiliary gardening structures and/or components.

SUMMARY OF THE INVENTION

These and other objects of the instant invention are achieved by providing apparatus for forming an above ground bed which plantlife may be grown and for irrigating the bed. The apparatus comprises a plurality of modular members arranged to be readily connected to one another to form a walled enclosure disposed on the ground. The enclosure is arranged to be filled with a plant growing medium to form the bed. Each of the members is an elongated hollow body having a pair of ends and releasably connecting means located adjacent each of the ends. The connecting means are arranged to releasably connect the members to one another to form enclosures of various shapes. Each of the members also includes a plurality of small apertures in communication with the hollow interior thereof and means for introducing a liquid into the interior. So constructed the liquid may seep out of the members and into the bed to irrigate the bed.

BRIEF DESCRIPTION OF THE DRAWING

FIG. 3 is an enlarged sectional view taken along line 3—3 of FIG. 2;

FIG. 4 is an enlarged sectional view taken along line 4—4 of FIG. 2;

FIG. 6 is an enlarged sectional view taken along line 6—6 of FIG. 2.

DETAILED DESCRIPTION OF THE PREFERRED EMBODIMENT

Figure 1:
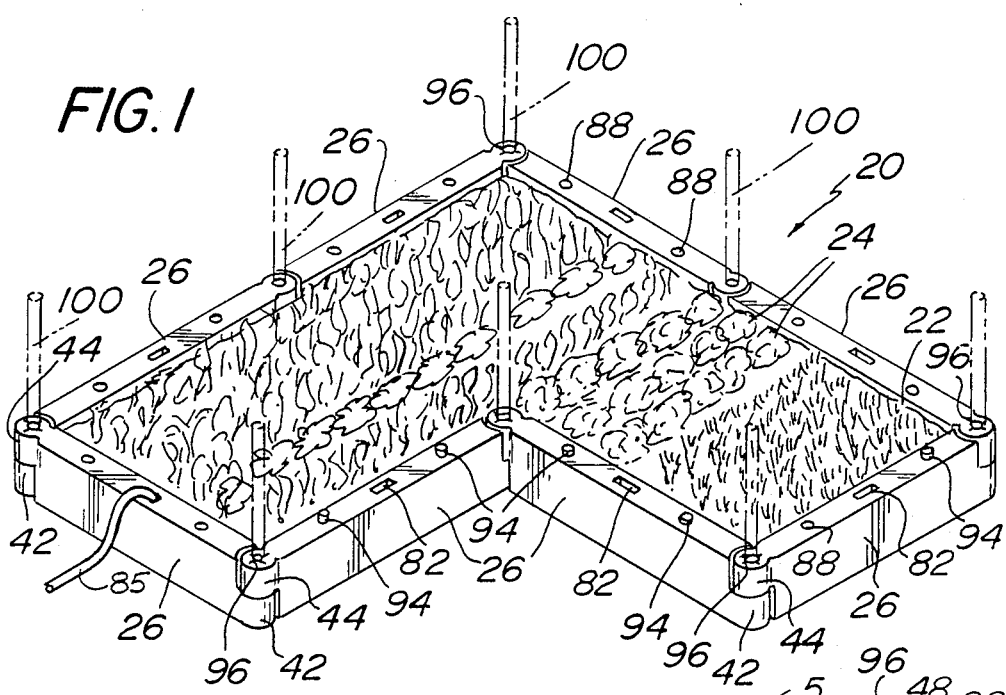
FIG. 1 is a perspective view of the modular, self irrigating, raised-bed system of this invention.

Referring now in greater detail to the various figures of the drawing wherein like reference characters refer to like parts, there is shown in FIG. 1 a modular system 20 for forming a raised-bed 22 in which plants 24, vegetables, flowers or other vegetation may be grown. The details of the system 20 will be described hereinafter. Suffice it for now to state that the system consists of a plurality of elongated, modular, enclosure forming members 26 which are arranged to be readily interconnected together to form an enclosure for the bed 22.

The members 26 are modular in construction and arranged so that they can be readily put together to form beds of a variety of shapes and sizes, e.g., hexagonal, L-shaped (such as shown in FIG. 1). The modular members 26 forming the beds can be stacked one on top of another to form increased height beds or for use on sloping ground.

Each member 26 includes as an integral part thereof self-irrigation means. That means basically comprises an arrangement of plural seep holes which permit constant, even, underground irrigation of the bed. The members 26 of the system also include built-in means for supporting other agricultural devices or structures, such as plastic grow covers, trellises, etc. The use of grow covers enables the bed to be used in early spring and late fall to extend the growing season. In summer, the members 26 of the system 20 can be used to support a shading structure, e.g., shading cloth, to protect heat sensitive plants.

As can be seen in FIGS. 2-5, each of the members 26 is an elongated hollow body including a generally planar bottom wall 28, a generally planar top wall 30, a generally planar outside wall 32, and a generally planar inside wall 34. The walls are all the same thickness, e.g., 0.9 inch (2.3 mm.) and define therebetween a hollow interior cavity 36.

Figure 2:
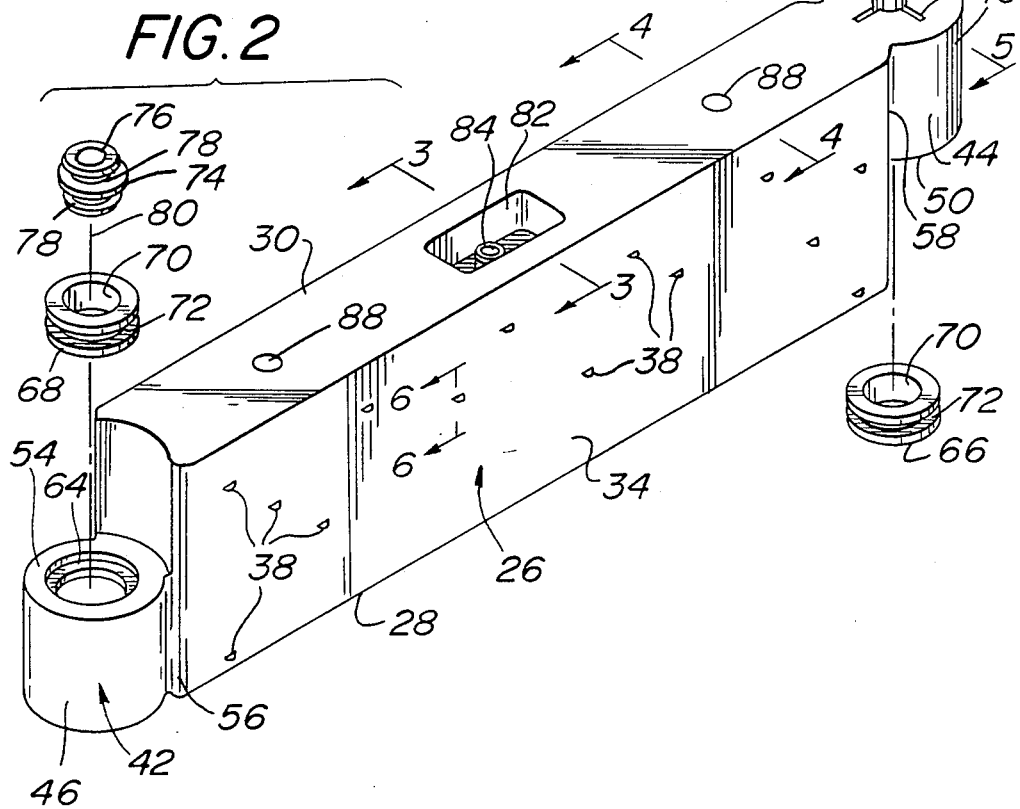
FIG. 2 is an enlarged exploded perspective view of one component of the system shown in FIG. 1.

The inside wall includes portions which are deformed inward at a plurality of spaced locations to form plural dimples 38. Each of the dimples includes a small diameter, e.g., 3/64 inch (1.2 mm.), seep hole 40 extending therethrough. As seen in FIGS. 2 and 6, the dimples 38 are each of a hemispherical shape, with the plane of the dimple extending inward at an angle of approximately 15 degrees to the plane of the side wall 34. It is through the seep holes 40 that water or some other liquid introduced into the interior 36 of the member 26 can seep out to irrigate the soil of the bed 22 which is enclosed by the interconnected members 26.

The means for effecting the releasable securement of the enclosure forming members 26 to one another basically comprises connecting members 42 and 44 disposed at respective ends of each of the elongated enclosure members 26. Each of the connecting members is in the form of a hollow cylindrically-shaped side wall portion 46 extending from the side walls 32 and 34 of the member 26. One of the connector members, 44, includes a top wall 48 which is flat, flush and contiguous with the top wall 30 of the member 26. The other connector member 42 includes a bottom wall (not shown) which is flat, flush and contiguous with the bottom wall 28 of the elongated member 26. Each of the two connecting members 42 and 44 is only half the height of the elongated member 26. Thus, the upper connecting member 44 includes a bottom wall 50 (FIG. 5) which is disposed so that its outer surface just terminates at the midline 52 (FIG. 5) of the height of the elongated member 26, while the lower connector member 42 includes a top wall 54 whose outer surface just terminates at the midline 52. As can be seen in FIGS. 1 and 2, the interface of the cylindrical sidewall 46 of the two connector members 42 and 44 and the respective planar sidewalls 32 and 34 is in the form of respective tapering wall portions 56 and 58. The thickness of the intermediate tapering wall portions 56 and 58, as well as the cylindrical sidewall 46 and top and bottom wall of each of the two connectors 42 and 44, is the same thickness as the sidewalls and top and bottom walls of the member 26.

In accordance with the preferred embodiment of the invention, each elongated enclosure member 26 and its two connector members 42 and 44 is formed as an integral unit by rotationally molding it of a moisture impervious, corrosion resistent material, e.g., polyethylene or other suitable plastic or other material. The midline 52 is located at the parting line of the mold (not shown) forming the member. As will be appreciated by those skilled in the art, the members 26 are hermaphroditic in shape.

When the elongated enclosure members 26 are connected together to form the bed 22 the upper connector 44 of one member 26 is arranged to be releasably, pivotably secured to the lower connector member 42 of the immediately adjacent enclosure member 22.

Figure 5:
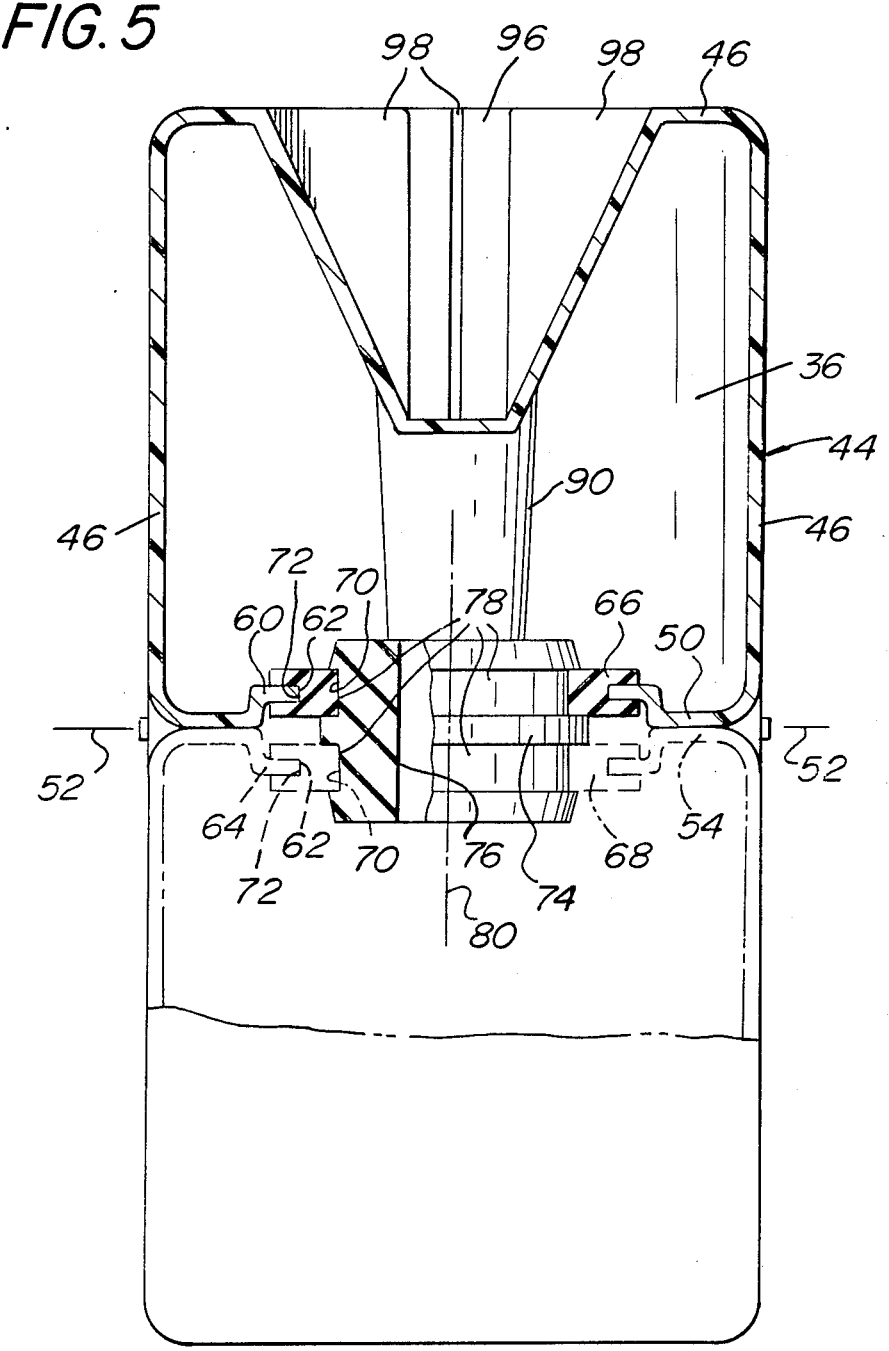
FIG. 5 is an enlarged sectional view taken along line 5—5 of FIG. 2.

The means for effecting the interconnection of the upper connector member 44 of one elongated enclosure member 26 to the lower connector member 42 of the immediately adjacent elongated enclosure member 26 will now be described. Thus, as can be seen in FIG. 5, the bottom wall 50 of the upper connector member includes a circular recessed portion 60. A hole 62 is provided in the wall at the bottom of the recess 60. A similar recess 64 (FIG. 2) is provided in the top wall 54 of the bottom connector 42. That recess also includes the hertofore identified hole 62. A pair of resilient material, e.g., rubber, grommets 66 and 68 are provided to interconnect any two connector members 42 and 44 of adjacent elongated members 26 together. Thus, as can be seen in FIG. 2, each grommet is of a generally cylindrical configuration having a central passageway 70 extending therethrough and an annular recess 72 disposed about its periphery. The recess is adapted to receive the edge of the wall contiguous with the hole 62, to hold the grommet in place therein. A rigid tube or coupling 74 is provided to extend through the central openings 70 in the pair of grommets 66 and 68. The tube 74 serves several purposes, namely, to hold the connector members together, to form an axis about which the two members 26 can pivot with respect to each other to establish the desired shape of the bed, and to provide the means for enabling water, or some other irrigating or feeding liquid to flow between the interconnected members. Thus, as can be seen in FIG. 5, the tube 74 is a hollow cylindrical member having a central passageway 76 extending therethrough and a pair of annular recesses 78 disposed about its outer periphery. The tube 74 is arranged so that its upper annular recess 78 seats the grommet 66 of the upper connector member 44 while the lower annular recess 78 seats the grommet 68 of the lower connector member 42. The central axis 80 of the tube serves as the rotational axis about which the two elongated members 26 can be pivoted with respect to one another to establish the desired angular orientation therebetween.

As mentioned earlier, the tube 74 serves as means for enabling water introduced into the hollow interior 36 of one elongated member 26 to flow into the elongated member 26 pivotably connected thereto. Thus, when water or some other liquid is introduced into one elongated member, as will be described hereinafter, the water or other liquid is enabled to flow through the tube interconnecting that member to the immediately adjacent member and from that member through its tube 74 to the next member, and so forth and so on to the remaining members 26 forming the bed's enclosure. Accordingly, water can be introduced into one member but is enabled to flow throughout the entire system so that it can slowly exit out of all of the seep holes 38 in the sidewalls of the members 26, thereby continuously and uniformly irrigating the bed.

As can be seen in FIGS. 1 and 3, a generally rectangular recess 82 is provided in the top wall 30 of each member 26. A threaded tubular fitting 84 is arranged to be screwed into an opening 86 in the bottom wall of at least one recess 82. The threaded fitting 84 is of a conventional size, e.g., ¾ inch (1.9 cm), to be coupled to a conventional garden hose fitting (not shown) so that water can be introduced through the hose 85, through the fitting 84 and into the interior 36 of the member 26. The fitting 84 is located in the recess (as opposed to being in the top wall of the elongated member 26) so that two or more members 26 can be stacked one on top of another to form a multiple height bed, and without the fitting 84 interfering with the stackability of the members.

As shown in FIG. 1, 2 and 4, each of the elongated members 26 also includes a walled passageway 88 extending therethrough from the top wall 30 and the bottom wall 28. The walled passageway 88 includes two conically-shaped sections, namely, an upper section 90 which tapers downward from the top wall to the midline 52 of the elongated member 26, and a bottom section 92 which tapers upward from the bottom wall to the midline. The inside diameter of the passageway 88 is smallest at the midline. Each of the passageways 88 serves as a means for receiving a stake 94 (FIG. 1) extending therethrough and into the ground on which the member 26 is disposed. Accordingly, the members 26 forming the raised-bed can be fixed to the ground so that they will not shift or move about. The tapering passages serve to ensure that the members 26 do not slip on the stakes.

As mentioned earlier, the system 20 includes means for supporting associated or auxilliary structures or devices on the enclosure forming the bed. Thus, as can be seen in FIGS. 1, 2, 4 and 5, the top wall 30 of each of the upper connector members 44 includes a central cylindrical recess 96 therein and from which four planar recesses 98 project radially. The cylindrical recess 96 provides a gripping hole for supporting a pole 100 or standard of the auxilliary structure, e.g., plastic grow cover, trellis, etc., (not shown) therein. Thus, as will be appreciated when the plural elongated members 26 are connected together to form the enclosure, each joint of the enclosure includes a recess 96 into which a pole, support leg or some other support member of some auxilliary gardening structure can be mounted to support that structure on the enclosure. The walls of the members forming the recesses 98 serve to strengthen or reinforce the central recess 96. The heretofore identified stake passageways 88 can also serve as a means for supporting the standards or legs of the plastic grow cover or other auxilliary component on the members 26, if desired.

In accordance with the preferred embodiment of this invention, the elongated enclosure forming members 26 are approximately three feet (91.4 cm) long, approximately eight inches (20.3 cm) high, and with the outside diameter of the cylindrical sidewall of each connector member being four inches (10.1 cm). The diameter of the holes 62 in the connector members 42 and 44 are each two inches (5.1 cm). The seep holes 40 are spaced throughout the inner sidewall 34 of each member, starting at a height of approximately ½ inch (1.3 mm) above the bottom wall to a height of approximately 6½ inches (16.5 mm) from the bottom wall. The recess 96 in the top wall 30 of the upper connector 44 is approximately 21/32 inch (1.7 mm) in diameter by 2 inches (5.08 cm) deep and with the projecting fin-like recesses extending out to a maximum of 1¼ inch (3.2 cm) from the center of the recess 96. The depth of the recess 60 in the undersided wall 50 of the upper connector member 44 and in the recess 64 in the upper wall 54 of the lower connector member are 42 each 3/16 inch (0.48 cm) deep. The rectangular recess 82 in the top wall 30 of the elongated member 26 is approximately 4 inches (10.2 cm) long, 2 inches (5.1 cm) wide, and 1½ inch (3.8 cm) deep. The dimples 38 are ¼ inch (0.64 cm) in diameter.

In the interests of asthetics, the top and front surface of the elongated members 26 are molded to have a woodgrain finish so that the completed bed looks like it was formed of railroad ties or other wood structural members.

As should be appreciated by the foregoing, the self irrigating raised-bed system of the subject invention combines the advantages of raised-bed gardening with a drip-method of uniform constant irrigation. Moreover, the system is relatively low in cost, can be readily assembled, disassembled or reconfigured for various sizes and shaped beds. Moreover, by virtue of their construction, the members forming the system are lightweight, can be readily stored or stacked when not in use, and are affordable for the home gardener.

Without further elaboration the foregoing will so fully illustrate our invention that others may, by applying current or future knowledge, adopt the same for use under various conditions of service.

I claim:

1. Apparatus for forming an above ground bed in which plant life may be grown and for irrigating said bed, said apparatus comprising a plurality of modular members and releasable connecting means therefor, said members being arranged to be readily connected to one another by said releasable connecting means to form a walled enclosure disposed generally horizontally on the ground, said enclosure being arranged to be configured in various shapes and to be filled with a plant growing medium to form said bed, each of said members comprising an elongate hollow body having a pair of ends, said releasable connecting means being located adjacent each of said ends, each of said releasable connecting means comprising generally vertically oriented conduit means and ring means releasably disposed about said conduit means, said ring means and said conduit means cooperating with each other and with two of said members to releasably pivotally connect said two of said members to each other at any one of various angular orientations with respect to a vertical axis extending through said conduit means to form an enclosure of one of said various shapes, said conduit means introducing a liquid into the interior of one of said two members from the other of said members to which said one member is pivotally connected, each of said members including a plurality of small apertures in communication with the hollow interior of said member, whereupon said liquid may flow through said conduit means from one member to another and slowly seep out of said members into said bed to irrigate said bed.

2. The apparatus of claim 1 wherein each of said members is formed of a plastic material.

3. The apparatus of claim 2 wherein each of said plastic members is a thin walled body.

4. The apparatus of claim 1 wherein said releasable connecting means additionally comprises portions of the ends of said members, said portions being hermaphroditic.

5. The apparatus of claim 1 wherein each of said elongate members includes a top wall portion having at least one mounting opening therein adapted to mount an auxilary component thereon.

6. The apparatus of claim 5 wherein at least one of said mounting openings comprises a recess formed in the top wall portion and located adjacent one end of said member, said recess including a circular central portion having a plurality of planar recesses radiating therefrom.

7. The apparatus of claim 1 wherein each of said members includes means to enable said member to be staked to the ground.

8. The apparatus of claim 7 wherein said means for enabling said member to be staked to the ground comprises and opening extending through said member.

9. The apparatus of claim 3 wherein each of said members includes a sidewall portion having a regular surface and with a plurality of small dimples projecting inward from said surface, each of said dimples including one of said apertures therein.

10. The apparatus of claim 9 wherein each of said dimples comprises a planar surface portion of said sidewall extending downwardly and inwardly at an acute angle from the vertical direction.

11. The apparatus of claim 10 wherein said dimple is of approximately semicircular shape of ¼ inch (6.4 mm) radius and wherein said aperture is approximately 3/64 inch (1.2 mm) in diameter.

12. The apparatus of claim 1 wherein at least one of said members includes a fitting for connection to a hose.

13. The apparatus of claim 1 wherein said conduit means is a generally rigid linear tube and wherein said each of said ring means comprises at least one resilient material ring connected to at least one of said members.

14. The apparatus of claim 13 wherein each of said ring means comprises a pair of resilient material rings, each of said rings being connected to a respective one of said members being connected.

* * * * *